United States Patent
Sonera et al.

(10) Patent No.: US 12,417,203 B1
(45) Date of Patent: Sep. 16, 2025

(54) HIGH SPEED, EXTENSIBLE AND SELF-HEALING DATA NETWORK FOR AESA RFIC ARRAYS

(71) Applicant: Rockwell Collins, Inc., Cedar Rapids, IA (US)

(72) Inventors: Yoel H. Sonera, Palm Bay, FL (US); James B. West, Cedar Rapids, IA (US); Jacob G. Teague, West Melbourne, FL (US); James P. Meinecke, Fayetteville, AR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/667,476

(22) Filed: May 17, 2024

(51) Int. Cl.
| | | |
|---|---|---|
| *G06F 13/42* | (2006.01) | |
| *H01Q 3/26* | (2006.01) | |
| *H01Q 3/28* | (2006.01) | |
| *H01Q 3/36* | (2006.01) | |
| *H04B 1/40* | (2015.01) | |

(52) U.S. Cl.
CPC ...... *G06F 13/4265* (2013.01); *G06F 13/4282* (2013.01); *H01Q 3/2682* (2013.01); *H01Q 3/28* (2013.01); *H01Q 3/36* (2013.01); *H04B 1/40* (2013.01)

(58) Field of Classification Search
CPC ............ G06F 13/4282; G06F 13/4265; H01Q 3/2682; H01Q 3/28; H01Q 3/36; H04B 1/40
See application file for complete search history.

(56) References Cited

U.S. PATENT DOCUMENTS

| | | |
|---|---|---|
| 8,902,101 B1 | 12/2014 | Sishtla et al. |
| 9,478,858 B1 * | 10/2016 | West ............... G01S 13/953 |
| 9,831,906 B1 | 11/2017 | Xie et al. |
| 10,833,408 B2 | 11/2020 | Paulsen et al. |
| 10,910,709 B1 | 2/2021 | Hill et al. |
| 11,018,425 B1 | 5/2021 | Hageman et al. |
| 11,093,429 B1 | 8/2021 | Munetoh |
| 11,469,918 B2 | 10/2022 | Cui et al. |

(Continued)

FOREIGN PATENT DOCUMENTS

| | | |
|---|---|---|
| EP | 3661075 A1 | 6/2020 |
| GB | 2592259 A | 8/2021 |

*Primary Examiner* — Phong H Dang
(74) *Attorney, Agent, or Firm* — Suiter Swantz IP

(57) ABSTRACT

An AESA may include a point-to-point serial interface between RFIC that implements positional addressing and is extensible to an unlimited amount of RFIC. A controller of the AESA may access registers of one or more RFIC and sends control and synchronization signals using a low-latency serial interface. The AESA may include primary and secondary interfaces which form a mesh network allowing communications around defective devices or interconnects and reduced area overhead resulting in array size reduction. The AESA may include health monitoring to determine location of data network faults providing improved array mean-time between failure (MTBF) and fault recovery. The AESA may allow faster antenna array configuration and beam steering rates for improved uptime and optimized scan modes. The AESA may experience improvements in manufacturability and reliability due to redundancy and fault isolation. The AESA may include more RFIC per serial interface allows scaling into larger arrays.

20 Claims, 10 Drawing Sheets

(56) References Cited

U.S. PATENT DOCUMENTS

| | | |
|---|---|---|
| 11,835,648 B2 | 12/2023 | Sishtla et al. |
| 11,886,366 B2 | 1/2024 | Mishra et al. |
| 2017/0118125 A1* | 4/2017 | Mishra ................ G06F 13/4282 |
| 2021/0081348 A1* | 3/2021 | Rodd ................... G06F 13/4291 |
| 2022/0308165 A1 | 9/2022 | Teague et al. |
| 2023/0223707 A1* | 7/2023 | Franson ............... H01Q 21/065 |
| | | 343/893 |
| 2024/0347907 A1* | 10/2024 | Cohen ................. H01Q 1/2208 |

* cited by examiner

HIGH SPEED, EXTENSIBLE AND SELF-HEALING DATA NETWORK FOR AESA RFIC ARRAYS

TECHNICAL FIELD

The present disclosure generally relates to transmission of digital information, and more specifically to mesh networks.

BACKGROUND

Active electronically scanned array (AESA) antennas used in multi-mode radars require a large amount of radio frequency integrated circuits (RFIC) interconnected through a data communications network. Most RFIC use multi-drop serial peripheral interface (SPI) busses which are limited to a few devices per bus and slow clock rates. The multi-drop method creates signal integrity issues, single points of failure and limits the array size and control rate. The AESA antennas may be limited to four of the RFIC per multi-drop bus due to signal integrity and addressing limitations.

The AESA may include tens, hundreds, or thousands of the RFIC. The AESA may then require large and complex interface bus routing between the controller and the RFIC to control the RFIC, including additional control and address signals. The number of RFIC in the AESA may be limited by the number of multi-drop busses required to control the RFIC due to space limitations in routing the multi-drop busses while maintaining spacing between adjacent RFIC. Reliability may also be reduced due to the complexity of the RFIC interface to the controller.

The AESA may also experience clock speed limits due to the multi-drop SPI bus. The clock speed limits may be due to signal integrity issues from long traces, board-to-board interfaces.

Therefore, it would be advantageous to provide a device, system, and method that cures the shortcomings described above.

SUMMARY

In some aspects, the techniques described herein relate to an active electronically scanned array including: a controller; a plurality of radio frequency integrated circuits, wherein the plurality of radio frequency integrated circuits are arranged in a lattice; a plurality of primary point-to-point serial interfaces; and a plurality of secondary point-to-point serial interfaces, wherein each of the plurality of radio frequency integrated circuits include one primary input from the plurality of primary point-to-point serial interfaces and one secondary input from the plurality of secondary point-to-point serial interfaces, wherein each of the plurality of radio frequency integrated circuits include one primary output to the plurality of primary point-to-point serial interfaces and one secondary output to the plurality of secondary point-to-point serial interfaces; wherein the controller and the plurality of radio frequency integrated circuits are configured to transmit a plurality of network messages between the controller and the plurality of radio frequency integrated circuits over the plurality of primary point-to-point serial interfaces and the plurality of secondary point-to-point serial interfaces; wherein the plurality of network messages include: a read network message including a read command frame and a first plurality of data frames; a write network message including a write command frame and a second plurality of data frames; a write-all network message including a write-all command frame and a third plurality of data frames; and a sync network message including a sync command frame.

In some aspects, the techniques described herein relate to an active electronically scanned array, wherein the read network message and the write network message use positional addressing to define an address of the first plurality of data frames and the second plurality of data frames.

In some aspects, the techniques described herein relate to an active electronically scanned array, wherein the read command frame, the first plurality of data frames, the write command frame, the second plurality of data frames, the write-all command frame, and the third plurality of data frames each include a same frame size.

In some aspects, the techniques described herein relate to an active electronically scanned array, wherein the first plurality of data frames immediately follow the read command frame, the second plurality of data frames immediately follow the write command frame, and the third plurality of data frames immediately follow the write-all command frame.

In some aspects, the techniques described herein relate to an active electronically scanned array, wherein the plurality of radio frequency integrated circuits are configured to append the first plurality of data frames to the read network message in response to receiving the read command frame, wherein the plurality of radio frequency integrated circuits are configured to truncate the second plurality of data frames from the write network message in response to receiving the write command frame.

In some aspects, the techniques described herein relate to an active electronically scanned array, wherein the read command frame, the first plurality of data frames, the write command frame, the second plurality of data frames, the write-all command frame, and the third plurality of data frames each include a start bit, a header, and a packet payload.

In some aspects, the techniques described herein relate to an active electronically scanned array, wherein the packet payload of the read command frame, the write command frame, and the write-all command frame each include a plurality of address bits for the first plurality of data frames, the second plurality of data frames, and the third plurality of data frames, respectively.

In some aspects, the techniques described herein relate to an active electronically scanned array, wherein the plurality of radio frequency integrated circuits each include: a first receiver, a first decoder, a second receiver, a second decoder, a router, a plurality of device registers, a first encoder, a first transmitter, a second encoder, and a second transmitter; wherein the plurality of address bits contain a register address of one or more of the plurality of device registers.

In some aspects, the techniques described herein relate to an active electronically scanned array, wherein the plurality of address bits do not indicate to and from which of the plurality of radio frequency integrated circuits the plurality of network messages are addressed.

In some aspects, the techniques described herein relate to an active electronically scanned array, wherein the controller is configured to read a health status message from the radio frequency integrated circuits by sending the read network message with the read command frame including the packet payload with the address at which a health status message is stored in the plurality of device registers.

In some aspects, the techniques described herein relate to an active electronically scanned array, wherein the plurality of radio frequency integrated circuits are each configured to write the packet payload of the third plurality of data frames into the plurality of device registers.

In some aspects, the techniques described herein relate to an active electronically scanned array, wherein the first receiver and the second receiver receive serial input from the plurality of primary point-to-point serial interfaces and the plurality of secondary point-to-point serial interfaces, respectively.

In some aspects, the techniques described herein relate to an active electronically scanned array, wherein the first decoder is coupled to the first receiver, wherein the second decoder is coupled to the second receiver, wherein the first decoder and the second decoder are each configured to decode a data signal to determine a command frame and one or more data frames of a network message.

In some aspects, the techniques described herein relate to an active electronically scanned array, wherein the router is coupled to the first decoder, the second decoder, the plurality of device registers, the first decoder, and the second decoder.

In some aspects, the techniques described herein relate to an active electronically scanned array, wherein the header includes a plurality of bits indicating whether a frame is the read command frame, the write command frame, the write-all command frame, the sync command frame, or a data frame.

In some aspects, the techniques described herein relate to an active electronically scanned array, wherein the plurality of primary point-to-point serial interfaces and the plurality of secondary point-to-point serial interfaces include a clock signal and a data signal, wherein one of the clock signal and the data signal are on separate pins or the clock signal is encoded onto the data signal using Manchester encoding.

In some aspects, the techniques described herein relate to an active electronically scanned array, wherein the plurality of primary point-to-point serial interfaces are arranged orthogonal to plurality of secondary point-to-point serial interfaces.

In some aspects, the techniques described herein relate to an active electronically scanned array, including a plurality of multi-chip modules; wherein the plurality of multi-chip modules include the plurality of radio frequency integrated circuits and a plurality of transmit/receive modules.

In some aspects, the techniques described herein relate to an active electronically scanned array, wherein the plurality of radio frequency integrated circuits are arranged in a plurality of arrays, wherein the plurality of primary point-to-point serial interfaces and the plurality of secondary point-to-point serial interfaces connect the plurality of arrays.

In some aspects, the techniques described herein relate to an AESA including: a controller; a plurality of multi-chip modules, wherein the plurality of multi-chip modules include: a plurality of radio frequency integrated circuits, wherein the plurality of radio frequency integrated circuits are arranged in a lattice; and a plurality of transmit/receive modules; a plurality of primary point-to-point serial interfaces; a plurality of secondary point-to-point serial interfaces, wherein each of the plurality of radio frequency integrated circuits include one primary input from the plurality of primary point-to-point serial interfaces and one secondary input from the plurality of secondary point-to-point serial interfaces, wherein each of the plurality of radio frequency integrated circuits include one primary output to the plurality of primary point-to-point serial interfaces and one secondary output to the plurality of secondary point-to-point serial interfaces; wherein the controller and the plurality of radio frequency integrated circuits are configured to transmit a plurality of network messages between the controller and the plurality of radio frequency integrated circuits over the plurality of primary point-to-point serial interfaces and the plurality of secondary point-to-point serial interfaces; wherein the plurality of network messages include: a read network message including a read command frame and a first plurality of data frames; a write network message including a write command frame and a second plurality of data frames, wherein the read network message and the write network message use positional addressing to define an address of the first plurality of data frames and the second plurality of data frames; a write-all network message including a write-all command frame and a third plurality of data frames; and a sync network message including a sync command frame.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
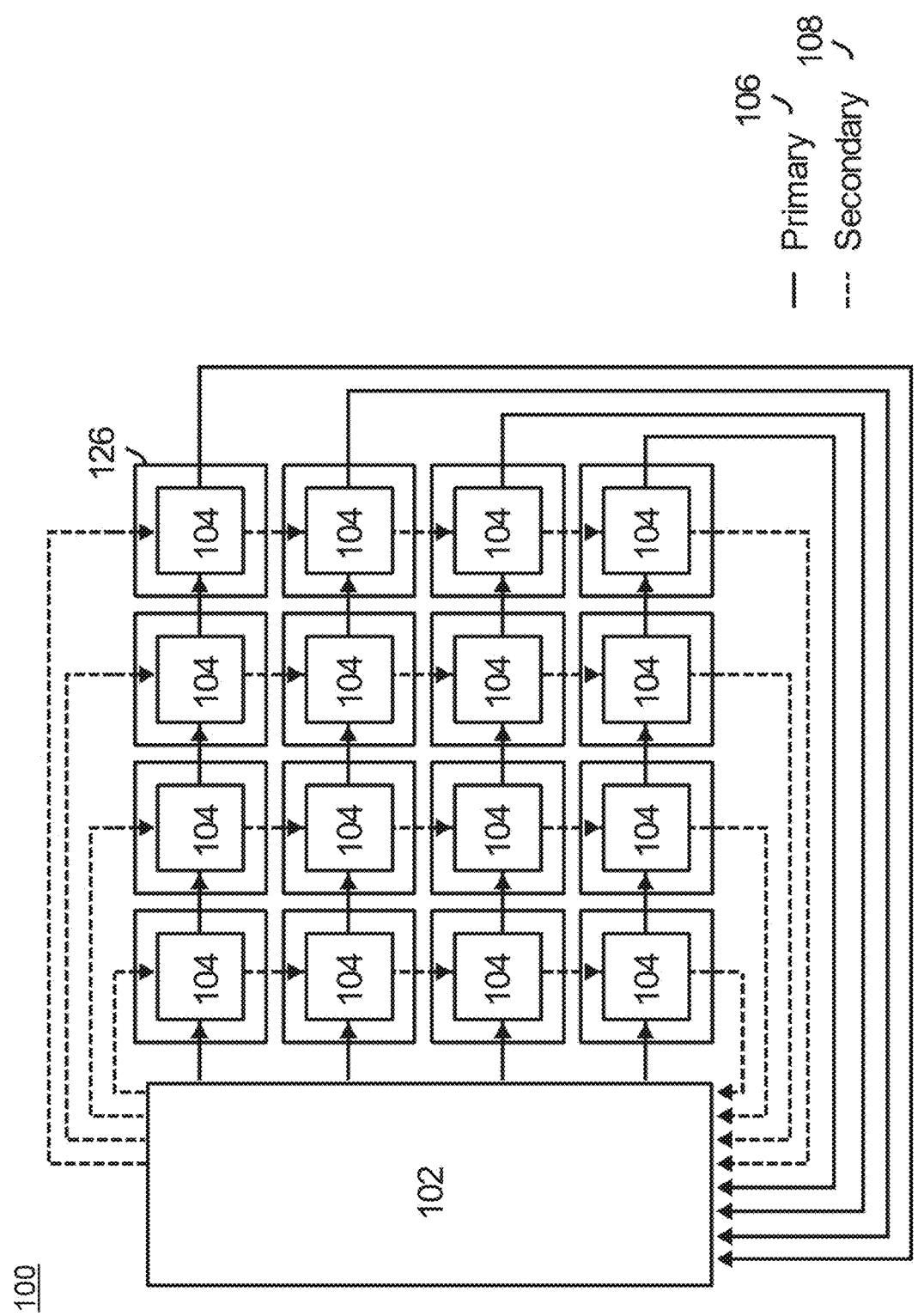
FIG. 1A depicts an architecture of an AESA, in accordance with one or more embodiments of the present disclosure.
Figure 1B:
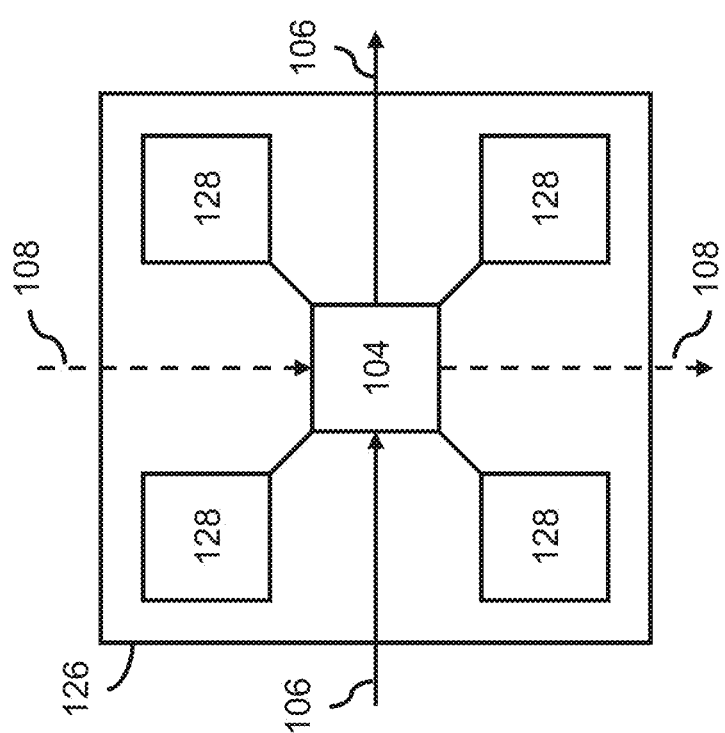
FIG. 1B depicts a multi-chip module of the AESA with an RFIC, in accordance with one or more embodiments of the present disclosure.
Figure 1C:
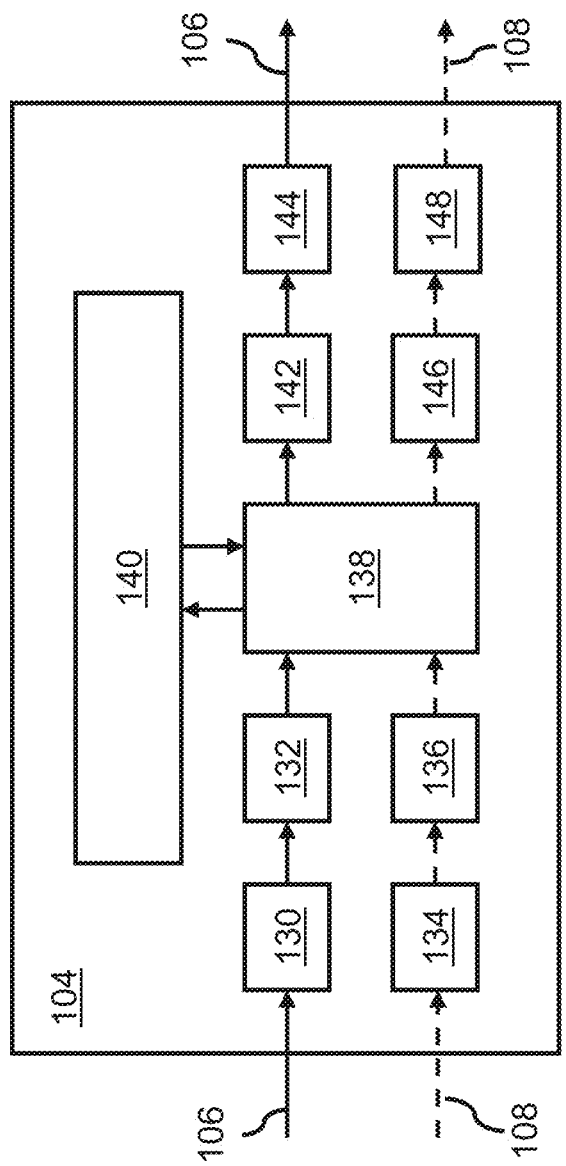
FIG. 1C depicts a block diagram of the RFIC, in accordance with one or more embodiments of the present disclosure.
Figure 1D:
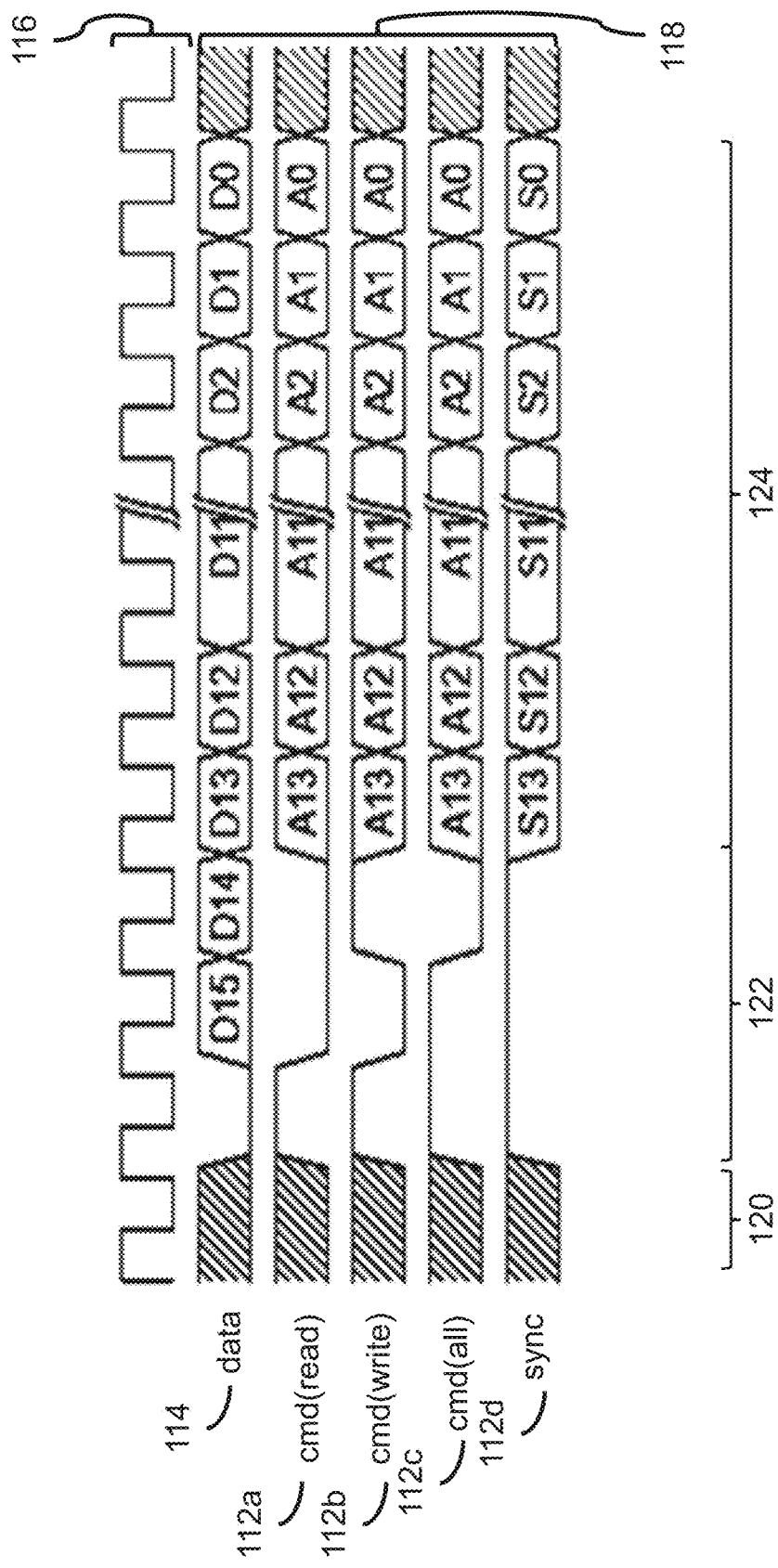
FIG. 1D depicts command frames and data frames of a network message of the AESA, in accordance with one or more embodiments of the present disclosure.
Figure 1E:
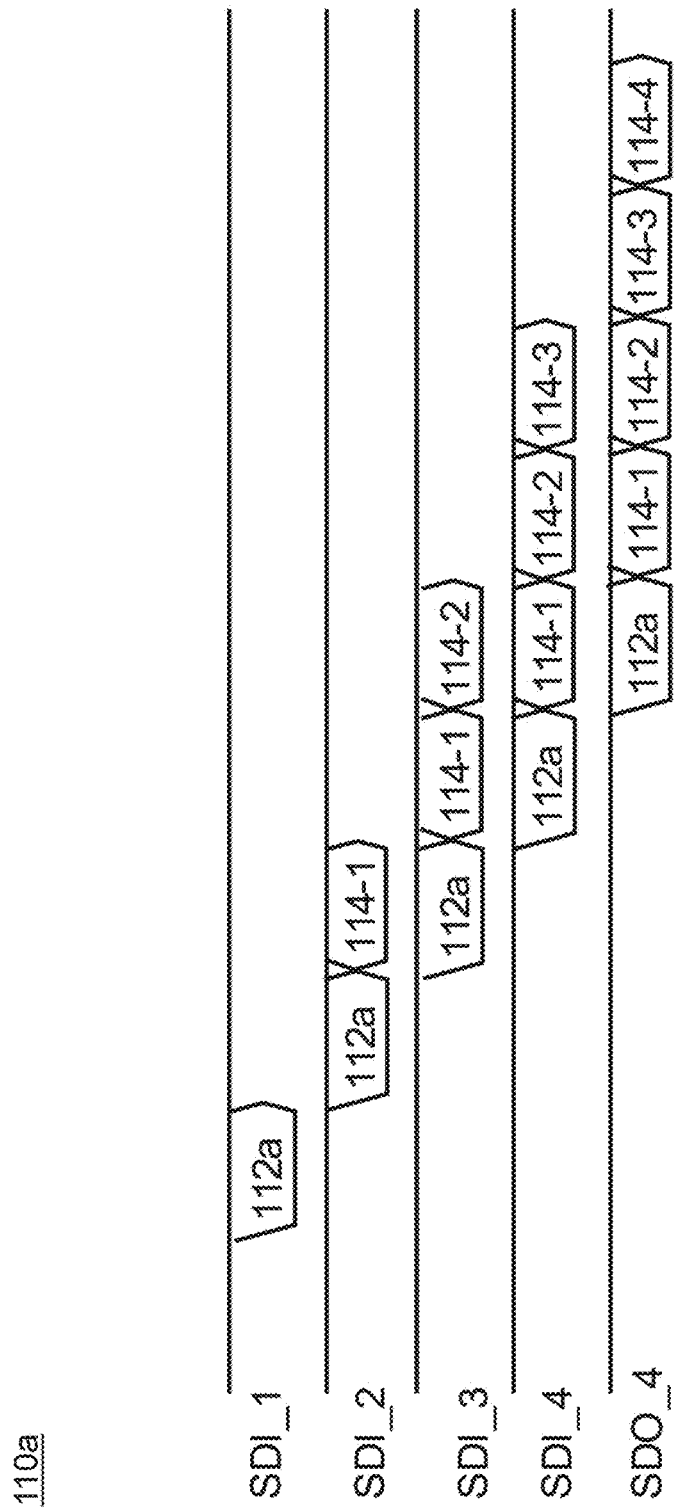
FIG. 1E depicts a timing diagram of a read network message of the AESA with serial data input (SDI) and serial data output (SDO), in accordance with one or more embodiments of the present disclosure.
Figure 1F:
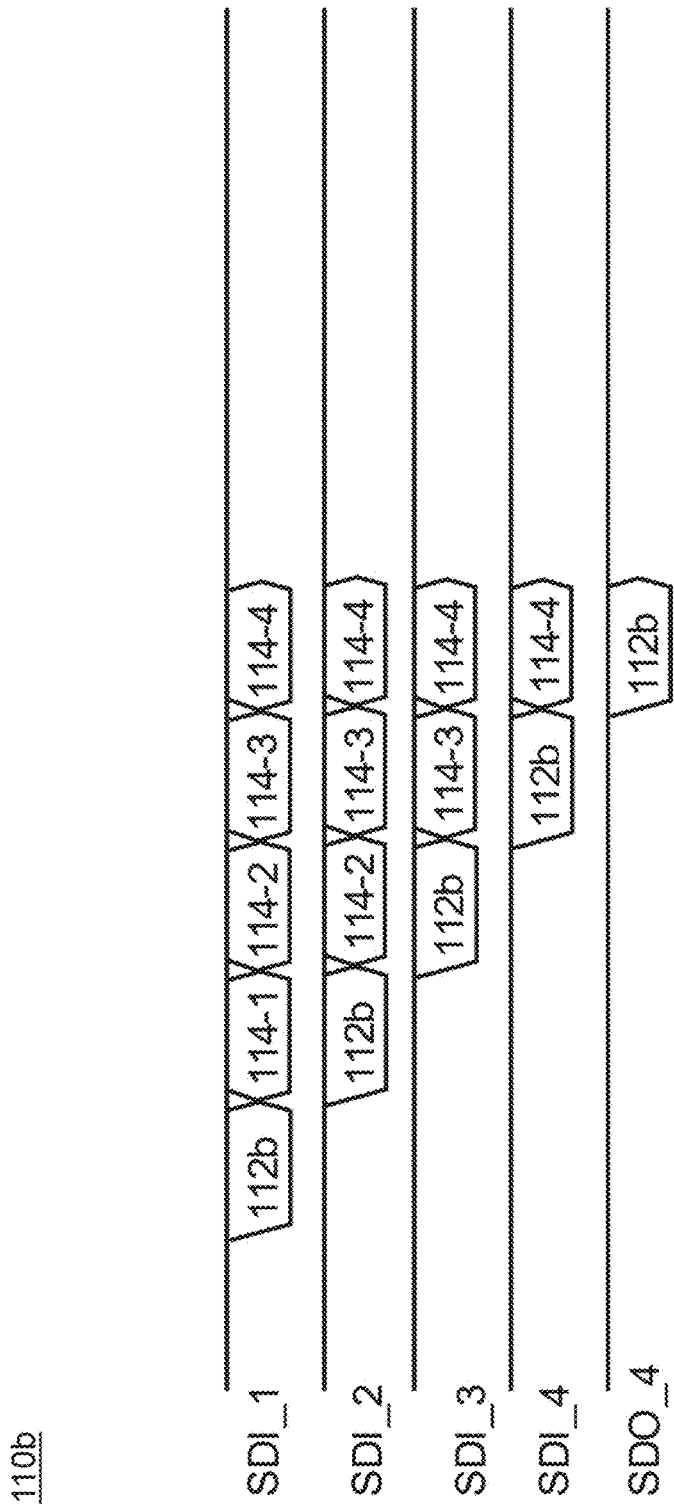
FIG. 1F depicts a timing diagram of a write network message of the AESA with SDI and SDO, in accordance with one or more embodiments of the present disclosure.
Figure 1G:
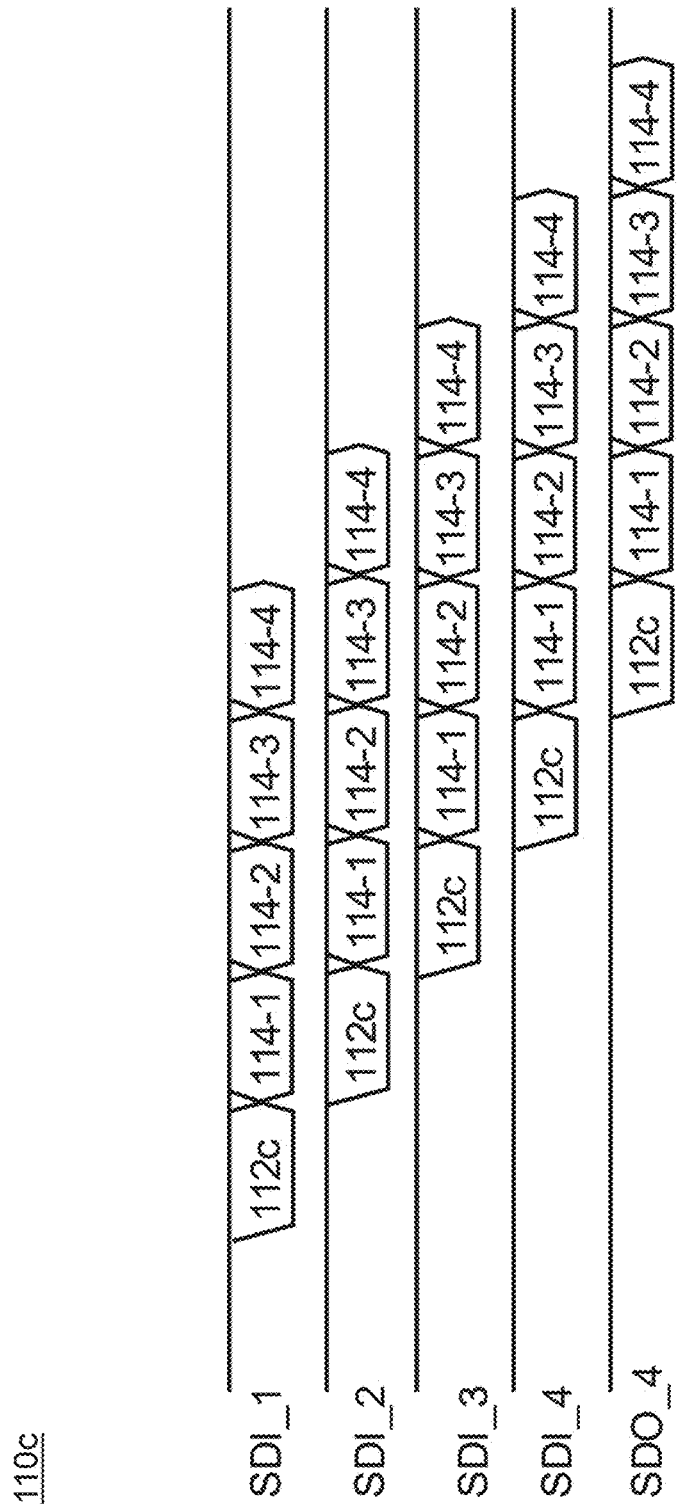
FIG. 1G depicts a timing diagram of a write-all network message of the AESA with SDI and SDO, in accordance with one or more embodiments of the present disclosure.
Figure 1H:
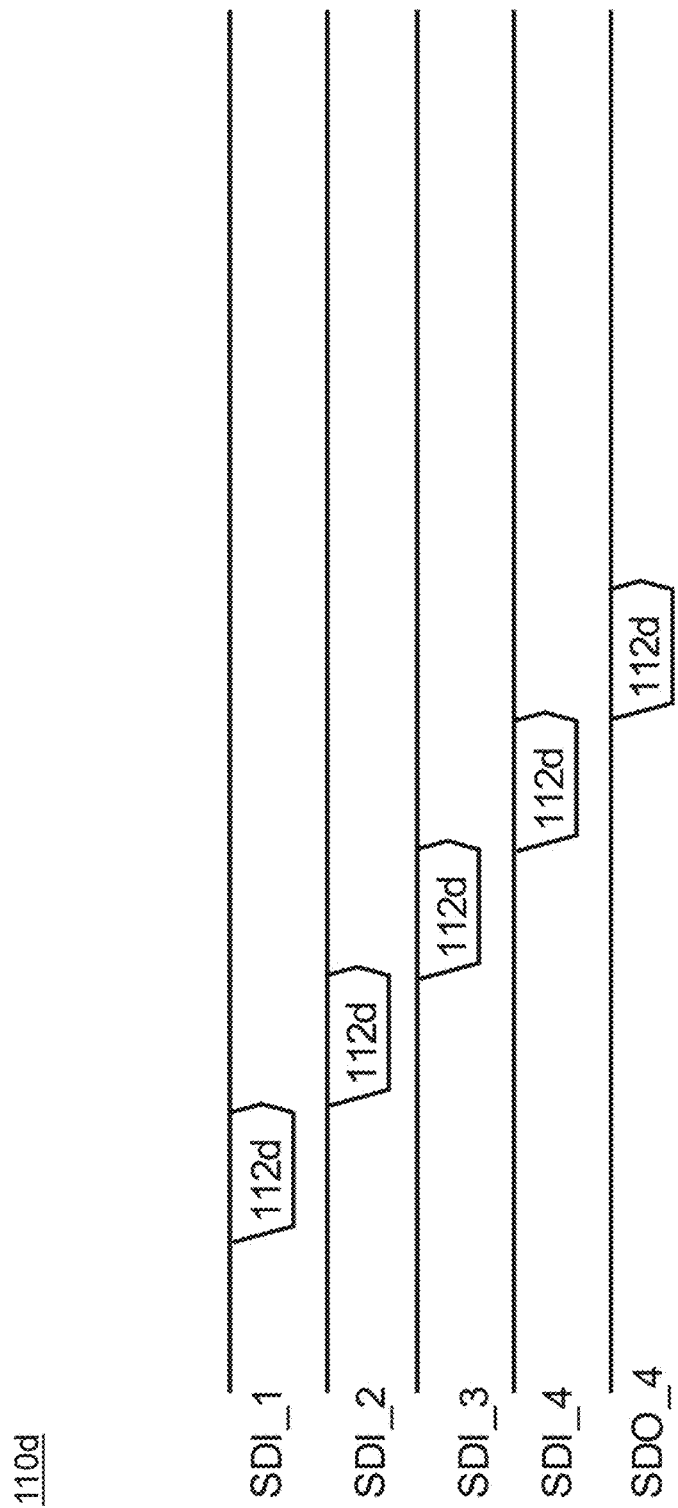
FIG. 1H depicts a timing diagram of a sync network message of the AESA with SDI and SDO, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings.

Embodiments of the present disclosure are directed to High Speed, Extensible and Self-Healing Data Network for Active Electronically Scanned Arrays (AESA) Radio frequency integrated circuit (RFIC) Arrays. The AESA may include a point-to-point serial interface between RFIC that implements positional addressing and is extensible to an unlimited amount of RFIC. A controller of the AESA may access registers of one or more RFIC and sends control and synchronization signals using a low-latency serial interface. The AESA may include primary and secondary interfaces which form a mesh network allowing communications around defective devices or interconnects and reduced area overhead resulting in array size reduction. The AESA may include health monitoring to determine location of data network faults providing improved array mean-time between failure (MTBF) and fault recovery. The AESA may allow faster antenna array configuration and beam steering rates for improved uptime and optimized scan modes. The AESA may experience improvements in manufacturability and reliability due to redundancy and fault isolation. The AESA may include more RFIC per serial interface allows scaling into larger arrays.

U.S. Pat. No. 9,478,858B1, titled "Multi-chip module architecture"; U.S. Pat. No. 10,833,408B2, titled "Electronically scanned array"; U.S. Pat. No. 10,910,709B1, titled "Control architecture for electronically scanned array"; U.S. Pat. No. 11,018,425B1, titled "Active electronically scanned array with power amplifier drain bias tapering for optimal power added efficiency"; U.S. Pat. No. 9,831,906B1, titled "Active electronically scanned array with power amplifier drain bias tapering"; are incorporated herein by reference in the entirety.

FIGS. 1A-1H depicts an AESA 100, in accordance with one or more embodiments of the present disclosure. The AESA 100 may include a controller 102, radio frequency integrated circuits (RFIC 104), primary point-to-point serial interfaces 106, and secondary point-to-point serial interfaces 108.

The controller 102 may be a beam steering computer for the AESA 100. The controller 102 may include control logic. The controller 102 may provide digital input/output (I/O) to the RFIC 104.

The AESA 100 may include any number of the RFIC 104. For example, the AESA 100 is depicted as including sixteen of the RFIC 104, although this is not intended to be limiting. The RFIC 104 may be arranged in a periodic array. The periodic array may be periodic along one or more rows and/or along one or more columns. The RFIC 104 may be arranged in a lattice. For example, the RFIC 104 may be arranged in a square lattice or the like. The lattice may include rows and columns of the RFIC 104. The rows of the RFIC 104 may be along the horizontal. The columns of the RFIC 104 may be along the vertical. The rows and columns of the RFIC 104 may be spaced apart at equal distances where the lattice is the square lattice.

The RFIC 104 may be directly or indirectly connected to the controller 102. The primary point-to-point serial interfaces 106 and/or the secondary point-to-point serial interfaces 108 may connect between pairs of the controller 102 and the RFIC 104 and/or pairs of the RFIC 104. Each of the primary point-to-point serial interfaces 106 and/or the secondary point-to-point serial interfaces 108 may only connect between two points (e.g., the controller 102 and one of the RFIC 104; two of the RFIC 104). The primary point-to-point serial interfaces 106 and/or the secondary point-to-point serial interfaces 108 do not connect between more than two of the points.

The primary point-to-point serial interfaces 106 and/or the secondary point-to-point serial interfaces 108 may be digital interconnects.

The primary point-to-point serial interfaces 106 and/or the secondary point-to-point serial interfaces 108 may be from the controller 102 to the RFIC 104. The primary point-to-point serial interfaces 106 and/or the secondary point-to-point serial interfaces 108 from the controller 102 to the RFIC 104 may provide serial data from the controller 102 to the RFIC 104. The primary point-to-point serial interfaces 106 and/or the secondary point-to-point serial interfaces 108 from the controller 102 to the RFIC 104 may also be referred to as Master-out, Slave-in (MOSI). The controller 102 may include one or more primary outputs (PRI) to the primary point-to-point serial interfaces 106 and one or more secondary outputs (SEC) to the secondary point-to-point serial interfaces 108. The one or more primary outputs to the primary point-to-point serial interfaces 106 and the one or more secondary outputs to the secondary point-to-point serial interfaces 108 may be primary inputs and secondary inputs, respectively, to one or more of the RFIC 104.

The primary point-to-point serial interfaces 106 and/or the secondary point-to-point serial interfaces 108 may be from the RFIC 104 to the RFIC 104. The primary point-to-point serial interfaces 106 and/or the secondary point-to-point serial interfaces 108 from the RFIC 104 to the RFIC 104 may provide serial data from the RFIC 104 to the RFIC 104. The primary point-to-point serial interfaces 106 and/or the secondary point-to-point serial interfaces 108 from the RFIC 104 to the RFIC 104 may also be referred to as Slave-out, Slave-in (SOSI).

Each of the RFIC 104 may include one primary input from the primary point-to-point serial interfaces 106 and one secondary input from the secondary point-to-point serial interfaces 108. Each of the RFIC 104 may also include one primary output to the primary point-to-point serial interfaces 106 and one secondary output to the secondary point-to-point serial interfaces 108. The one primary input to the RFIC 104 from the primary point-to-point serial interfaces 106 may either be the primary output from the controller 102 to the primary point-to-point serial interfaces 106 or the primary output from a previous of the RFIC 104 to the primary point-to-point serial interfaces 106. Similarly, the one secondary input to the RFIC 104 from the secondary point-to-point serial interfaces 108 may either be the secondary output from the controller 102 to the secondary point-to-point serial interfaces 108 or the secondary output from a previous of the RFIC 104 to the secondary point-to-point serial interfaces 108.

Each of the RFIC 104 may have at least two inputs and at least two outputs. For example, each of the RFIC 104 may have an input from the primary point-to-point serial interfaces 106, an input from the secondary point-to-point serial interfaces 108, an output to the primary point-to-point serial interfaces 106, and an output to the secondary point-to-point serial interfaces 108.

The primary point-to-point serial interfaces 106 and/or the secondary point-to-point serial interfaces 108 may be from the RFIC 104 to the controller 102. The primary point-to-point serial interfaces 106 and/or the secondary point-to-point serial interfaces 108 from the RFIC 104 to the controller 102 may provide serial data from the RFIC 104 to the controller 102. The primary point-to-point serial interfaces 106 and/or the secondary point-to-point serial interfaces 108 from the RFIC 104 to the controller 102 may also be referred to as Master-in, Slave-out (MISO).

The one primary output from the RFIC 104 to the primary point-to-point serial interfaces 106 may either be the primary input to the controller 102 from the primary point-to-point serial interfaces 106 or the primary input to a next of the RFIC 104 from the primary point-to-point serial interfaces 106. Similarly, the one secondary output from the RFIC 104 to the secondary point-to-point serial interfaces 108 may either be the secondary input to the controller 102 from the secondary point-to-point serial interfaces 108 or the secondary input to a next of the RFIC 104 from the secondary point-to-point serial interfaces 108.

The controller 102 may include one or more primary inputs from the primary point-to-point serial interfaces 106 and/or one or more secondary inputs from the secondary point-to-point serial interfaces 108. The one or more primary inputs to the controller 102 from the primary point-to-point serial interfaces 106 may be the primary output from the RFIC 104 to the primary point-to-point serial interfaces 106. Similarly, the one or more primary inputs to the controller 102 from the secondary point-to-point serial interfaces 108 may be the secondary output from the RFIC 104 to the secondary point-to-point serial interfaces 108.

Where the primary input and the secondary input are received from previous of the RFIC 104, none of the RFIC 104 may receive both the primary input and the secondary input from the same of the previous of the RFIC 104. Similarly, where the primary output and the secondary output are to a next of the RFIC 104, none of the RFIC 104 may output both the primary output and the secondary output to the same of the next of the RFIC 104. Thus, the input of the RFIC 104 may from unique pairs of the controller 102 and/or the RFIC 104 and/or the output from the RFIC 104 may be to unique pairs of the controller 102 and/or the RFIC 104.

The primary point-to-point serial interfaces 106 and/or the secondary point-to-point serial interfaces 108 may connect between the controller 102 and the RFIC 104 in a grid topology. The grid topology may provide a redundant serial interface architecture for the inputs to and the outputs from the RFIC 104.

The AESA 100 may include rows of the primary point-to-point serial interfaces 106 and/or columns of the secondary point-to-point serial interfaces 108. The primary point-to-point serial interfaces 106 and/or the secondary point-to-point serial interfaces 108 may be routed horizontally and vertically, respectively, to form the grid topology. The primary point-to-point serial interfaces 106 may be arranged orthogonal to secondary point-to-point serial interfaces 108. The primary point-to-point serial interfaces 106 may be arranged orthogonal to secondary point-to-point serial interfaces 108 such that each of the RFIC 104 may be controlled by either the primary point-to-point serial interfaces 106 and/or the secondary point-to-point serial interfaces 108. The primary point-to-point serial interfaces 106 may be independent of the secondary point-to-point serial interfaces 108. The primary point-to-point serial interfaces 106 may not share a common path with the secondary point-to-point serial interfaces 108.

The AESA 100 may include any number of the RFIC 104 in the columns and/or rows. The RFIC 104 may form an M-by-N array of the RFIC 104, where M and N are integers which are two or greater. M and N may or may not be the same. For example, the AESA 100 is depicted as including M=four of the RFIC 104 along the horizontal and N=four of the RFIC 104 along the vertical, thereby forming a four-by-four array of the RFIC 104. The AESA 100 may include at four rows of the RFIC 104 and/or at least four columns of the RFIC 104. The RFIC 104 may be arranged in at least a four-by-four array. It is contemplated that the AESA 100 may include up to a sixteen-by-sixteen array of the RFIC 104, or more. The number of the RFIC 104 in the rows and/or columns is only limited by the physical size of the AESA 100 and the desired update rate.

Rows of the primary point-to-point serial interfaces 106 and/or columns of the secondary point-to-point serial interfaces 108 may connect between the controller 102 and the RFIC 104 across power domains, or other common failure mode elements. The primary point-to-point serial interfaces 106 and/or the secondary point-to-point serial interfaces 108 may connect between the controller 102 and the RFIC 104 across power domains, or other common failure mode elements to avoid single points of failure.

The number of the primary point-to-point serial interfaces 106 may be based on the number of the RFIC 104. In the example of the four-by-four array of the RFIC 104, the AESA 100 may include four of the primary point-to-point serial interfaces 106 between the controller 102 and the first column of the RFIC 104, four of the primary point-to-point serial interfaces 106 between the first column of the RFIC 104 and the second column of the RFIC 104, four of the primary point-to-point serial interfaces 106 between the second column of the RFIC 104 and the third column of the RFIC 104, four of the primary point-to-point serial interfaces 106 between the third column of the RFIC 104 and the fourth column of the RFIC 104, and four of the primary point-to-point serial interfaces 106 between the fourth column of the RFIC 104 and the controller 102, for a total of twenty of the primary point-to-point serial interfaces 106.

The number of the secondary point-to-point serial interfaces 108 may be based on the number of the RFIC 104. In the example of the four-by-four array of the RFIC 104, the AESA 100 may include four of the secondary point-to-point serial interfaces 108 between the controller 102 and the first row of the RFIC 104, four of the secondary point-to-point serial interfaces 108 between the first row of the RFIC 104 and the second row of the RFIC 104, four of the secondary point-to-point serial interfaces 108 between the second row of the RFIC 104 and the third row of the RFIC 104, four of the secondary point-to-point serial interfaces 108 between the third row of the RFIC 104 and the fourth row of the RFIC 104, and four of the secondary point-to-point serial interfaces 108 between the fourth row of the RFIC 104 and the controller 102, for a total of twenty of the secondary point-to-point serial interfaces 108.

Connecting between the controller 102 and the rows of the RFIC 104 using the primary point-to-point serial interfaces 106 and/or the connecting between the controller 102 and the columns of the RFIC 104 using the secondary point-to-point serial interfaces 108 may enable extending the number of the RFIC 104 which are controlled by the controller 102. For example, the AESA 100 may enable larger arrays of the RFIC 104 due to not being limited to four of the RFIC 104 per multi-drip SPI bus.

The AESA 100 may include multi-chip modules (MCM 126). The AESA 100 may include an array of the MCM 126. For example, the MCM 126 may be arranged in the rows and the columns in the lattice to define the lattice of the RFIC 104. The MCM 126 may include the RFIC 104 and transmit/receive modules (T/R modules 128). Each of the MCM 126 may include one of the RFIC 104 and four of the T/R modules 128. In the example where the AESA 100 include a sixteen of the RFIC 104, the AESA 100 may include sixteen of the MCM 126 each including one of the sixteen of the RFIC 104 and may include sixty-four of the T/R modules 128, where each one of the sixteen of the MCM 126 includes four of the sixty-four of the T/R modules 128.

The controller 102 may be an array controller. The controller 102 may cause the each of the RFIC 104 within the MCM 126 to set, monitor, and adjust power levels for each of the T/R module 128 within the MCM 126.

The RFIC 104 may be coupled to the T/R modules 128. The RFIC 104 may be coupled to the T/R modules 128 using one or more analog signals.

The RFIC 104 may also be referred to as a RFIC transmit/receive (T/R) module chip. The RFIC 104 may be a mixed signal T/R RFIC module. The RFIC 104 may be a mixed signal T/R RFIC module in that the RFIC 104 may communicate using the digital logic signals over the primary point-to-point serial interfaces 106 and secondary point-to-point serial interfaces 108 and may communicate with the T/R modules 128 using the analog signals.

The RFIC 104 may be configured to control the T/R modules 128. For example, the RFIC 104 may be configured to provide bias and control of the T/R modules 128. The RFIC 104 may be a subarray controller for the T/R modules 128. The RFIC 104 may control the T/R modules 128. The RFIC 104 may set, monitor, and adjust power levels for each of the T/R module 128 within the MCM 126. The RFIC 104 may also be a beamformer. The RFIC 104 may cause the T/R modules 128 to form one or more beams.

A chip count in the MCM 126 may be minimized using the RFIC 104. The MCM 126 may include one of the RFIC 104 which controls four of the T/R modules 128. The RFIC 104 may include one or more channels for the T/R modules 128. For example, the RFIC 104 may include four channels, one for each of the T/R modules 128. The RFIC 104 may channelize the T/R modules 128. Channelizing the T/R modules 128 may allow the RFIC 104 to independently steer beams from each of the T/R modules 128. The RFIC 104 may cause the T/R modules 128 to independently steer the beams at different frequencies. The RFIC 104 may independently provide phase adjustments and gain control for each of the T/R modules 128.

The T/R modules 128 of the MCM 126 may form a subarray of the AESA 100. For example, the T/R modules 128 may form a two-by-two subarray within the MCM 126. In the example where the AESA 100 include a four-by-four array of the MCM 126, the AESA 100 may include the four-by-four array of the MCM 126 each with the two-by-two subarray of the T/R modules 128 within the MCM 126. In this example, the AESA 100 may include an eight-by-eight array of the T/R modules 128 within the AESA 100, for a total of sixty-four of the T/R modules 128.

The T/R modules 128 may include radiating elements which transmit and/or receive radio frequency ("RF") signals, a ground plane, a thermal management layer, and the like. The radiating elements may include horizontal polarization elements and/or vertical polarization elements. For example, each of the T/R modules 128 may include one of the horizontal polarization elements and one of the vertical polarization elements (i.e., a dual polarization element). Dual (or more) polarizations for a given frequency may be provided (e.g., polarimetric radar). The T/R modules 128 may control the power, frequency, phase, time delay, and the like of the radiating elements. The T/R modules 128 may amplify the signals into/out of the radiating elements. The T/R modules 128 may also switch the radiating elements between transmitting and receiving the signals. The spacing of the RFIC 104 in the lattice may maintain the radiating elements at a one-half wavelength spacing.

The RFIC 104 may include one or more semiconductor components. The RFIC 104 may include a transmit/receive (T/R) switch configured to alternate the RFIC 104 between a transmit mode and receive mode. The RFIC 104 may include a power amplifier (PA) and low noise amplifier (LNA) coupled to the T/R switch. The RFIC 104 may alternate between PA operation and LNA operation via the T/R switch. The RFIC 104 may include a directional coupler to sense a power output of the PA. The RFIC 104 may include a limiter (e.g., a Schottky diode limiter/switch) to limit a power input to the LNA.

The RFIC 104 may be made of a select material, such as, but not limited to, silicon germanium (SiGe). Silicon germanium may be a high volume, low cost, mixed signal digital analog RF material. Silicon germanium may be used because of a high circuit density (low cost per square millimeter).

The T/R modules 128 may be radio frequency chain circuits. The T/R modules 128 may include one or more electronic components, such as, but not limited to, a T/R switch, a directional coupler, a PIN diode limiter, a power amplifier (PA), a low-noise amplifier (LNA), and the like. high power transmit amplifiers (e.g., a final power amplifier), duplexers, filters, low-noise receive amplifiers (e.g., an initial power amplifier), phase shifters, time delay units, transmit/receive switches, and the like. The T/R modules 128 may be multi-function chips, including a power amplifier and low noise amplifier.

The T/R modules 128 may be made of a select material, such as, but not limited to, gallium arsenide (GaAs), gallium nitride (GaN), Indium Phosphide (InP), or the like.

The RFIC 104 may include a receiver 130, decoder 132, a receiver 134, a decoder 136, router 138, device registers 140, an encoder 142, a transmitter 144 (XMIT), an encoder 146, a transmitter 148, and the like.

The receiver 130 and the receiver 134 may receive serial input from the primary point-to-point serial interfaces 106 and secondary point-to-point serial interfaces 108, respectively. The receiver 130 and the receiver 134 may include a matching number of pins as the primary point-to-point serial interfaces 106 and secondary point-to-point serial interfaces 108, respectively. For example, the receiver 130 and the receiver 134 may each include one pin where the network messages 110 are Manchester encoded. By way of another example, the receiver 130 and the receiver 134 may each include two pin, one pin for the clock signal 116 and a second pin for the data signal 118. The receiver 130 and the receiver 134 may receive the serial input via the pins.

The receiver 130 and/or the receiver 134 may be configured to perform clock and data recovery on the input. For example, the receiver 130 and/or the receiver 134 may be configured to recover the clock signal 116 and/or the data signal 118 from the input received. The clock and data recover may be required where the network messages 110 is encoded using Manchester encoding. The receiver 130 and/or the receiver 134 may not perform clock and data recovery on the input where the receiver 130 and the receiver 134 may each include two pins.

The decoder 132 and the decoder 136 may also be referred to as serial decoders. The decoder 132 and the decoder 136 may be coupled to the receiver 130 and the receiver 134, respectively. The decoder 132 and the decoder 136 may receive from the receiver 130 and the receiver 134, respectively, the clock signal 116 and/or the data signal 118. The decoder 132 and the decoder 136 may decode the data signal 118 from the receiver 130 and the receiver 134, respectively. The decoder 132 and the decoder 136 may decode the data signal 118 to determine the frames (e.g., the command frame 112 and/or the data frames 114 of the network messages 110).

The router 138 may be coupled to the decoder 132 and/or the decoder 136. The router 138 may receive the command frame 112 and/or the data frames 114 of the network messages 110. The router 138 may receive the frames from the decoder 132 and the decoder 136 in parallel. The router 138 may discard the frames from the decoder 136 while the frames from the decoder 132 are valid.

The router 138 may also be coupled to the device registers 140, the encoder 142, and/or the encoder 146. The router 138 may route the command frame 112 and/or the data frames 114 of the network messages 110 to the device registers 140, the encoder 142, and/or the encoder 146. The router 138 may route the command frame 112 and/or the data frames 114 of the network messages 110 to the device registers 140, the encoder 142, and/or the encoder 146 based on the type of the command frame 112, as will be described further herein. For example, the routing of the command frame 112 and/or the data frames 114 may vary between the read command frame 112*a*, write command frame 112*b*, the write-all command frame 112*c*, and/or the sync command frame 112*d*.

The device registers 140 may receive the command frame 112 and/or the data frames 114 of the network messages 110. The device registers 140 may maintain one or more portions of the command frame 112 and/or the data frames 114 in the device registers 140. The device registers 140 may provide control and/or data storage/memory distribution among the MCM 126. The local memory within the MCM 126 may allow for the T/R modules 128 to switch the beam more quickly than storing data within the controller 102.

The device registers 140 may include a bit length. The bit length may be a multiple of eight (e.g., one byte). For example, the device registers 140 may be 8-bit registers, 16-bit registers, 24-bit registers, 32-bit registers, 64-bit registers, or the like. In embodiments, the device registers 140 are 16-bit registers.

One or more of the device registers 140 may be beam control registers. The device registers 140 may include the beam control registers for receiving beam control commands. The RFIC 104 may use the beam control commands to control the beam (e.g., polarity, gain, phase) of the T/R modules 128. Thus, the beam of the T/R modules 128 may be controlled using the beam control commands stored in the device registers 140. The device registers 140 may include at least one of the beam control registers for each of the T/R modules 128. The device registers 140 may allow for localized storage of the beam control commands. The computational burden to drive the beams may be distributed to the RFIC 104 from the controller 102.

The encoder 142 and/or the encoder 146 may also be referred to as serial encoders. The encoder 142 and/or the encoder 146 may be coupled to the router 138. The encoder 142 and/or the encoder 146 may receive the command frame 112 and/or the data frames 114 of the network messages 110 from the router 138. The encoder 142 and/or the encoder 146 may encode the command frame 112 and/or the data frames 114 of the network messages 110 received from the router 138 into the clock signal 116 and/or the data signal 118 for the primary point-to-point serial interfaces 106 and/or the secondary point-to-point serial interfaces 108, respectively.

The transmitter 144 and/or the transmitter 148 may be coupled to the encoder 142 and/or the encoder 146, respectively. The transmitter 144 and/or the transmitter 148 may be configured to output to the primary point-to-point serial interfaces 106 and/or the secondary point-to-point serial interfaces 108, respectively, the clock signal 116 and/or the data signal 118.

The transmitter 144 and/or the transmitter 148 may include a matching number of pins as the primary point-to-point serial interfaces 106 and secondary point-to-point serial interfaces 108, respectively.

The controller 102 and/or the RFIC 104 may be configured to transmit network messages 110 between the controller 102 and the RFIC 104 over the primary point-to-point serial interfaces 106 and/or the secondary point-to-point serial interfaces 108. The controller 102 and/or the RFIC 104 may be configured to transmit the network messages 110 between the controller 102 and the RFIC 104 over the primary point-to-point serial interfaces 106 and/or the secondary point-to-point serial interfaces 108 using logic signals. The controller 102 and/or the RFIC 104 may transmit the logic signals on the primary point-to-point serial interfaces 106 and the secondary point-to-point serial interfaces 108.

The primary point-to-point serial interfaces 106 and/or the secondary point-to-point serial interfaces 108 may include two logic signals. For example, the primary point-to-point serial interfaces 106 and/or the secondary point-to-point serial interfaces 108 may include only a clock signal 116 and a data signal 118. The clock signal 116 may provide transitions for each serial data bit in the network messages 110. The data signal 118 may include serial data bits.

The primary point-to-point serial interfaces 106 and/or the secondary point-to-point serial interfaces 108 may include one or more pins. The primary point-to-point serial interfaces 106 and/or the secondary point-to-point serial interfaces 108 may each include a single pin (as depicted). The clock signal 116 may be encoded onto the data signal 118 of the network messages 110 using Manchester encoding, allowing both the clock signal 116 and the data signal 118 to be carried by the single pin. The Manchester encoding may remove clock skew. It is further contemplated that the primary point-to-point serial interfaces 106 and/or the secondary point-to-point serial interfaces 108 may each include two pins (not depicted). A first of the two pins may carry the clock signal 116 and a second of the two pins may carry the data signal 118. The clock signal 116 and a data signal 118 of the network messages 110 are not encoded onto the two pins using Manchester encoding where the first of the two pins carries the clock signal 116 and the second of the two pins carries the data signal 118.

The primary point-to-point serial interfaces 106 and/or the secondary point-to-point serial interfaces 108 may use timeout-framing. The timeout-framing may include staring a frame start after a timeout period without receiving the clock signal 116 and/or the data signal 118.

Thus, the controller 102 may include sixteen pins when using Manchester encoding and where the AESA 100 include a four-by-four array of the RFIC 104. For example, the controller 102 may include four pin outs for the output to the primary point-to-point serial interfaces 106, four pin outs for the output to the secondary point-to-point serial interfaces 108, four pin ins for the input from the primary point-to-point serial interfaces 106, and four pin ins for the input from the secondary point-to-point serial interfaces 108. This arrangement may reduce the pins of the controller 102 as compared to the multi-drop SPI bus arrangement for a four-by-four array of the RFIC 104.

The primary point-to-point serial interfaces 106 and/or the secondary point-to-point serial interfaces 108 may not include a chip select logic signal (also referred to as a sub select logic signal). Thus, the primary point-to-point serial interfaces 106 and/or the secondary point-to-point serial interfaces 108 do not include a separate logic signal for indicating the address of the network messages 110.

The network messages 110 may follow a serial protocol. The network messages 110 may use positional addressing to define the address of the data frames 114. For example, the read network messages 110a and/or the write network messages 110b may use positional addressing to define the address of the data frames 114 within the read network messages 110a and/or within the write network messages 110b. The position of the data frames in the network messages 110 may indicate the address for the data frames. The RFIC 104 may be addressed using the position of the data frames 114 in the network messages 110. The address may refer to which of the RFIC 104 the data frames are to and/or from. The address may be determined by the position of the RFIC 104 in the grid network. The positional addressing may allow dense and larger number of the RFIC 104 in the AESA 100 with less signals and faster clock speeds. The positional addressing may not require the use of a chip select logic signal.

The network messages 110 may include one or more frames (e.g., command frame 112, data frames 114). The frames may refer to a digital data transmission unit. The frames may be transmitted over the serial data pins. The network messages 110 may include a command frame 112 followed by data frames 114. The first frame in the network messages 110 may be the command frame 112. A remainder of frames in the network messages 110 may be the data frames 114. The data frames 114 may immediately follow the command frame 112. For example, the data frames 114 of the read network messages 110a may immediately follow the read command frame 112a, the data frames 114 of the write network messages 110b may immediately follow the write command frame 112b, and/or the data frames 114 of the write-all network messages 110c may immediately follow the write-all command frame 112c.

The network messages 110 may include a select number of the data frames 114. The number of the data frames 114 may be based on the number of the RFIC 104 in the rows of the grid network, in the columns of the grid network, and/or whether the network messages 110 are transmitted over the primary point-to-point serial interfaces 106 and/or the secondary point-to-point serial interfaces 108. The number of the data frames 114 in the network messages 110 transmitted over the primary point-to-point serial interfaces 106 may be equal to the number of the RFIC 104 in the row. The number of the data frames 114 in the network messages 110 transmitted over the secondary point-to-point serial interfaces 108 may be equal to the number of the RFIC 104 in the column.

The current of the network messages 110 may terminate after a frame period without additional frames or with an idle pattern. A subsequent of the network messages 110 may be transmitted after the current of the network messages 110 is terminated.

The command frame 112 (CMD) may also be referred to as control frames (CTL).

The network messages 110 may be read network messages 110a, write network messages 110b, write-all network messages 110c, or sync network messages 110d. The command frame 112 may include a read command frame 112a, a write command frame 112b, a write-all command frame 112c, and/or a sync command frame 112d. The network messages 110 may be the read network messages 110a, the write network messages 110b, the write-all network messages 110c, or the sync network messages 110d where the network messages 110 includes the read command frame 112a, the write command frame 112b, the write-all command frame 112c, or the sync command frame 112d, respectively.

Each of the frames (e.g., the command frame 112 (e.g., the read command frame 112a, the write command frame 112b, the write-all command frame 112c, or the sync command frame 112d), the data frames 114) may include a same frame size. The frame size may also be referred to as bit length or the number of bits within the frames. For example, the read command frame 112a, the write command frame 112b, the write-all command frame 112c, the sync command frame 112d, and/or the data frames 114 may each include a same frame size. Each of the frames may include the same frame size to enable positional addressing within the AESA 100.

Each of the frames may include a start bit 120, a header 122, and a packet payload 124.

The start bit 120 may indicate the start of the frame. The start bit 120 may provide a one-bit gap between consecutive of frames. For example, the start bit 120 may provide a one-bit gap between consecutive of frames within one of the network messages 110. By way of another example, the start bit 120 may provide a one-bit gap between a last frame within a current of the network messages 110 and a first frame within a subsequent of the network messages 110.

The header 122 may follow the start bit 120. The header 122 may also be referred to as command bits. The header 122 may indicate whether the frame is the data frames 114, the read command frame 112a, the write command frame 112b, the write-all command frame 112c, or the sync command frame 112d. The header 122 may include a plurality of bits which indicate whether the frame is the data frames 114, the read command frame 112a, the write command frame 112b, the write-all command frame 112c, or the sync command frame 112d. For example, the header 122 may include a first bit, a second bit, and a third bit.

The first bit of the header 122 may indicate whether the frame is the command frame 112 or the data frames 114. For example, the first bit may be one to indicate the frame is the data frames 114 and may be zero to indicate the frame is the command frame 112. The specific values of zero and one for first bit of the header 122 are exemplary only and are not intended to be limiting. The meaning of zero and one may be reversed while enabling the first bit of the header 122 to indicate whether the frame is the command frame 112 or the data frames 114.

The second and third bit of the header 122 may indicate whether the command frame 112 is the read command frame 112a, the write command frame 112b, the write-all command frame 112c, or the sync command frame 112d. For example, the second bit and third bit may be zero-zero to indicate the command frame 112 is the read command frame 112a, may be zero-one to indicate the command frame 112 is the write command frame 112b, may be one-zero to indicate the command frame 112 is the write-all command frame 112c, or may be one-one to indicate the command frame 112 is the sync command frame 112d. The specific values of zero and one for second and third bits of the header 122 are exemplary only and are not intended to be limiting. It is contemplated that the second and third bit of the header 122 may include four permutations of the zero and one which each enable the second and third bit of the header 122 to indicate whether the command frame 112 is the read command frame 112a, the write command frame 112b, the write-all command frame 112c, or the sync command frame 112d.

Thus, the specific implementation of zero and ones for the first three bits of the header 122 of the frames may vary and is intended to be limiting so long as the first bit indicates whether the frame is the command frame 112 or the data frames 114 and the second and third bit indicate whether the command frame 112 is the read command frame 112a, the write command frame 112b, the write-all command frame 112c, or the sync command frame 112d.

The packet payload 124 may follow the header 122. The packet payload 124 may include data bits (D), address bits (A), and/or sync bits(S). The bits (e.g., the data bits (D), address bits (A), and/or sync bits(S)) of the packet payload 124 may be based on the type of the frame. The packet payload 124 of the data frames 114 may include the data bits (D). The packet payload 124 of the read command frame 112a, the write command frame 112b, and/or the write-all command frame 112c may include the address bits (A). The packet payload 124 of the sync command frame 112d may include the sync bits(S).

The data frame 114 may be used for reading and writing to the device registers 140. The packet payload 124 of the data frames 114 may be written and/or read from the device registers 140 of the RFIC 104. When writing to the device registers 140, the data bits (D) may specify a polarity, gain, phase, or the like for the T/R modules 128. When reading from the device registers 140, the data bits (D) may specify the signal received from the T/R modules 128 (e.g., the radio frequency signal received from the T/R modules 128).

The data frames 114 may use the second bit and the third bit of the header 122 for the data bits (D) of the packet payload 124. Thus, the packet payload 124 of the data frames 114 may be two bits larger than the packet payload 124 of the command frame 112. Using the second and third bits of the header 122 for the packet payload 124 may increase the data rate of the network messages 110 without increasing the length of the frames.

The address bits (A) of the read command frame 112a, the write command frame 112b, and/or the write-all command frame 112c may contain the register address of one or more of the device registers 140 of the RFIC 104. However, the address bits (A) of the read command frame 112a, the write command frame 112b, and/or the write-all command frame 112c may not indicate to/from which of the RFIC 104 the network messages 110 are addressed.

The sync bits(S) of the sync command frame 112d may propagate discrete values through the RFIC 104. The sync bits (B) may be a discrete bit that is sent to each of the RFIC 104. A remainder is left for the discrete values. The discrete values may also be referred to as control bits. The discrete values may turn on and/or off one or more functions of the RFIC 104.

Each of the frames (e.g., the command frame 112, the data frames 114) may include a select number of bits. The number of bits in each of the frames may be based on the length of the device registers 140 within the RFIC 104. The length of the frames may be selected such that the packet payload 124 of the data frames 114 match the length of the device registers 140. The length of the packet payload 124 of the data frame 114, including the including the two additional bits from the header 122, may be in multiples of eight. For example, the device registers 140 may be sixteen-bit registers. The length of each of the frames may be eighteen bits. The bits of the data frames 114 may include the one bit for the start bit 120, the one bit for the header 122, and sixteen data bits (D15 through D0) for the packet payload 124. The bits of the read command frame 112a, the write command frame 112b, and/or the write-all command frame 112c may include the one bit for the start bit 120, the three bits for the header 122, and fourteen address bits (A13 through A0) for the packet payload 124. The bits of the sync command frame 112d may include the one bit for the start bit 120, the three bits for the header 122, and fourteen sync bits (S13 through S0) for the packet payload 124.

The packet payload 124 may also include one or more parity bits (P). For example, the parity bits (P) may be a last bit of the packet payload 124 (e.g., D0, A0, S0). The parity bits (P) may provide error correcting code (ECC) to the frames. For example, the bit-value of the parity bits (P) may be selected such that a Hamming weight of the frame may always be even or always be odd.

The read network messages 110a may be used to read different of the packet payloads 124 from the same register address of each of the RFIC 104. The read network messages 110a initially transmitted by the controller 102 may include zero of the data frames 114. The position of the data frames 114 in the read network messages 110a may indicate the address of the data frames 114 to the RFIC 104. For example, the position of the data frames 114 from first to last may correspond to the position of the RFIC 104 from first to last along the row and/or along the column. The read command frame 112a may include a register address of one or more of the device registers 140 of the RFIC 104. The read command frame 112a may cause the RFIC 104 to initiate read operations. In response to receiving the read command frame 112*a*, the router 138 may retrieve data which is maintained at the register address of one or more of the device registers 140 of the RFIC 104. The router 138 may then append the data which is maintained at the register address into the packet payload 124 of a new copy of the data frames 114 at the end of the network messages 110. The router 138 may forward the network messages 110 with the new copy of the data frames 114 to the encoder 142 and/or the encoder 146. The RFIC 104 may append the data frames 114 to the read network messages 110*a* in response to receiving the read command frame 112*a*. Thus, the number of the data frames 114 in the read network messages 110*a* may increase by one after being received by each of the RFIC 104 in series. The read network messages 110*a* received by the controller 102 may include M-number or N-number of the data frames 114, where M or N is the number of the RFIC 104 along the rows and columns, respectively.

For example, a first of the RFIC 104 may receive a serial data input (SDI_1) from the controller 102 with only the read command frame 112*a*. The router 138 of the first of the RFIC 104 may read the packet payload 124 of a first data frame 114-1 from the register address indicated in the read command frame 112*a* and append to the read network messages 110*a*. A second of the RFIC 104 may receive a serial data input (SDI_2) from the first of the RFIC 104 with the read command frame 112*a* and the first data frame 114-1 addressed in position from the first of the RFIC 104. The router 138 of the second of the RFIC 104 may read the packet payload 124 of a second data frame 114-2 from the register address indicated in the read command frame 112*a* and append to the read network messages 110*a*. A third of the RFIC 104 may receive a serial data input (SDI_3) from the second of the RFIC 104 with the read command frame 112*a*, the first data frame 114-1 addressed in position from the first of the RFIC 104, and the second data frame 114-2 addressed in position from the second of the RFIC 104. The router 138 of the third of the RFIC 104 may read the packet payload 124 of a third data frame 114-3 from the register address indicated in the read command frame 112*a* and append to the read network messages 110*a*. A fourth of the RFIC 104 may receive a serial data input (SDI_4) from the third of the RFIC 104 with the read command frame 112*a*, the first data frame 114-1 addressed in position from the first of the RFIC 104, the second data frame 114-2 addressed in position from the second of the RFIC 104, and the third data frame 114-3 addressed in position from the third of the RFIC 104. The router 138 of the fourth of the RFIC 104 may read the packet payload 124 of a fourth data frame 114-4 from the register address indicated in the read command frame 112*a* and append to the read network messages 110*a*. The fourth of the RFIC 104 may output a serial data output (SDO_4) to the controller 102 with the read command frame 112*a*, the first data frame 114-1 addressed in position from the first of the RFIC 104, the second data frame 114-2 addressed in position from the second of the RFIC 104, the third data frame 114-3 addressed in position from the third of the RFIC 104, and the fourth data frame 114-4 addressed in position from the fourth of the RFIC 104.

The write network messages 110*b* may be used to write different of the packet payloads 124 to the same register address of each of the RFIC 104. The write network messages 110*b* initially transmitted by the controller 102 may include M-number or N-number of the data frames 114, where M or N is the number of the RFIC 104 along the rows and columns, respectively. The position of the data frames 114 in the write network messages 110*b* may indicate the address of the data frames 114 to the RFIC 104. For example, the position of the data frames 114 from first to last may correspond to the position of the RFIC 104 from first to last along the row and/or along the column. The write command frame 112*b* may include a register address of one or more of the device registers 140 of the RFIC 104. The write command frame 112*b* may cause the RFIC 104 to initiate write operations. In response to receiving the write command frame 112*b*, the router 138 may write the packet payload 124 from the first of the data frames 114 in the network messages 110 to the register address of the device registers 140. The router 138 may also truncate the first of the data frames 114 from the write network messages 110*b* and forward the write command frame 112*b* and the remainder of the data frames 114 to the encoder 142 and/or the encoder 146. The RFIC 104 may truncate the data frames 114 from the write network messages 110*b* in response to receiving the write command frame 112*b*. Thus, the number of the data frames 114 in the write network messages 110*b* may decrease by one after being received by each of the RFIC 104 in series. The write network messages 110*b* received by the controller 102 may include zero of the data frames 114.

For example, the first of the RFIC 104 may receive a serial data input (SDI_1) from the controller 102 with the write command frame 112*b*, the first data frame 114-1 addressed in position to the first of the RFIC 104, the second data frame 114-2 addressed in position to the second of the RFIC 104, the third data frame 114-3 addressed in position to the third of the RFIC 104, and the fourth data frame 114-4 addressed in position to the fourth of the RFIC 104. The router 138 of the first of the RFIC 104 may write the packet payload 124 of the first data frame 114-1 to the register address indicated in the write command frame 112*b* and truncate the first data frame 114-1 from the write network messages 110*b*. The second of the RFIC 104 may receive a serial data input (SDI_2) from the first of the RFIC 104 with the write command frame 112*b*, the second data frame 114-2 addressed in position to the second of the RFIC 104, the third data frame 114-3 addressed in position to the third of the RFIC 104, and the fourth data frame 114-4 addressed in position to the fourth of the RFIC 104. The router 138 of the second of the RFIC 104 may write the packet payload 124 of the second data frame 114-2 to the register address indicated in the write command frame 112*b* and truncate the second data frame 114-2 from the write network messages 110*b*. The third of the RFIC 104 may receive a serial data input (SDI_3) from the second of the RFIC 104 with the write command frame 112*b*, the third data frame 114-3 addressed in position to the third of the RFIC 104, and the fourth data frame 114-4 addressed in position to the fourth of the RFIC 104. The router 138 of the third of the RFIC 104 may write the packet payload 124 of the third data frame 114-3 to the register address indicated in the write command frame 112*b* and truncate the third data frame 114-3 from the write network messages 110*b*. The fourth of the RFIC 104 may receive a serial data input (SDI_4) from the third of the RFIC 104 with the write command frame 112*b* and the fourth data frame 114-4 addressed in position to the fourth of the RFIC 104. The router 138 of the fourth of the RFIC 104 may write the packet payload 124 of the fourth data frame 114-4 to the register address indicated in the write command frame 112*b* and truncate the fourth data frame 114-4 from the write network messages 110*b*. The fourth of the RFIC 104 may output a serial data output (SDO_4) to the controller 102 with only the write command frame 112*b*.

The RFIC 104 may each write all the packet payloads 124 from the data frames 114 of the write-all network messages 110c. The write-all network messages 110c may be used to write the same of the packet payloads 124 to the same register address of each of the RFIC 104. The write-all network messages 110c may be used to initialize the RFIC 104. The write-all network messages 110c initially transmitted by the controller 102 may include any integer number of the data frames 114. The position of the data frames 114 in the write-all network messages 110c may not indicate the address of the data frames 114 to the RFIC 104. Instead, the data frames 114 in the write-all network messages 110c may be addressed to each of the RFIC 104. The write-all command frame 112c may include a register address of one or more of the device registers 140 of the RFIC 104. The write-all command frame 112c may cause the RFIC 104 to initiate write-all operations. The router 138 may forward the data frames 114 to the register address indicated by the write-all command frame 112c. The router 138 may also forward the write-all network messages 110c without changing any of the data frames 114 to the encoder 142 and/or the encoder 146. Thus, each of the RFIC 104 may write the same information using the write-all network messages 110c. The write-all network messages 110c received by the controller 102 may include the same number of the data frames 114 as was initially transmitted.

The RFIC 104 may auto-increment register address indicated in the write-all command frame 112c when writing the packet payload 124 of multiple of the data frame 114. Thus, the packet payload 124 of multiple of the data frame 114 may be written to consecutive registers within the device registers 140.

For example, the first of the RFIC 104 may receive a serial data input (SDI_1) from the controller 102, the second of the RFIC 104 may receive a serial data input (SDI_2) from the first of the RFIC 104, the third of the RFIC 104 may receive a serial data input (SDI_3) from the second of the RFIC 104, the fourth of the RFIC 104 may receive a serial data input (SDI_4) from the third of the RFIC 104, and the fourth of the RFIC 104 may output a serial data output (SDO_4) to the controller 102, where each of the serial data inputs and serial data outputs include the write-all command frame 112c and a matching number of the data frames 114. As depicted, each of the serial data inputs and serial data outputs include first data frame 114-1 through fourth data frame 114-4, although this number of data frames is not intended to be limiting. The router 138 of each of the first, second, third, and fourth of the RFIC 104 may write the packet payload 124 of the first data frame 114-1 at the register address indicated in the write-all command frame 112c, the packet payload 124 of the second data frame 114-2 at the register address indicated in the write-all command frame 112c incremented by one, the packet payload 124 of the third data frame 114-3 at the register address indicated in the write-all command frame 112c incremented by two, and the packet payload 124 of the fourth data frame 114-4 at the register address indicated in the write-all command frame 112c incremented by three.

The sync network messages 110d may not include any of the data frames 114. The sync command frame 112d may cause the RFIC 104 to initiate sync operations. The sync command frame 112d may include one or more discrete values. The router 138 may forward the sync network messages 110d to the encoder 142 and/or the encoder 146. The sync network messages 110d may be transmitted with minimal latency due to not including any of the data frames 114. The sync network messages 110d may interrupt current of the network messages 110 to synchronize each of the RFIC 104.

For example, the first of the RFIC 104 may receive a serial data input (SDI_1) from the controller 102, the second of the RFIC 104 may receive a serial data input (SDI_2) from the first of the RFIC 104, the third of the RFIC 104 may receive a serial data input (SDI_3) from the second of the RFIC 104, the fourth of the RFIC 104 may receive a serial data input (SDI_4) from the third of the RFIC 104, and the fourth of the RFIC 104 may output a serial data output (SDO_4) to the controller 102, where each of the serial data inputs and serial data outputs include the sync command frame 112d.

One or more frames of the read network messages 110a, the write network messages 110b, and/or the write-all network messages 110c may overlap when transmitting the frames between the controller 102 and the RFIC 104. For example, the RFIC 104 may forward the command frames 112 and/or the data frames 114 while receiving the network messages 110. The sync command frames 112d of the sync network messages 110d may not overlap when transmitting the frames between the controller 102 and the RFIC 104.

It is contemplated that the AESA 100 may achieve 44/88 Mbps data rate (clockless/clocked) at a clock rate of one-hundred MHz. For example, each of the frame may be eighteen-bits. The signal may have two transitions of the clock for each one bit using Manchester encoding (e.g., fifty MHz). The packet payload 124 of each of the data frames 114 may be sixteen bits, resulting in a speed of 44 Mbps for Manchester encoding.

The AESA 100 may use the read network messages 110a, the write network messages 110b, the write-all network messages 110c, or the sync network messages 110d for the primary input/outputs on the primary point-to-point serial interfaces 106 and/or as the secondary input/outputs on the secondary point-to-point serial interfaces 108. The primary inputs may be passed through to the primary output on the primary point-to-point serial interfaces 106. The secondary inputs may be passed through to the secondary outputs on the secondary point-to-point serial interfaces 108.

The secondary point-to-point serial interfaces 108 may allow for continued operation and control in the event of a single point failure on the primary point-to-point serial interfaces 106. If the primary point-to-point serial interfaces 106 providing the primary input to one or more of the RFIC 104 fail, then the secondary point-to-point serial interfaces 108 providing the secondary input to one or more of the RFIC 104 may be used to reroute the frames between the RFIC 104. Broken or failed of the RFIC 104 and/or the primary point-to-point serial interfaces 106 may be remapped using the secondary point-to-point serial interfaces 108 while maintaining communication of the network messages 110 between the controller 102 and the RFIC 104. Thus, the secondary point-to-point serial interfaces 108 may provide fault-tolerance and prevent the RFIC 104 in a same row or column from being inaccessible due to failure of single of the RFIC 104 or a single of the primary point-to-point serial interfaces 106.

Figure 2:
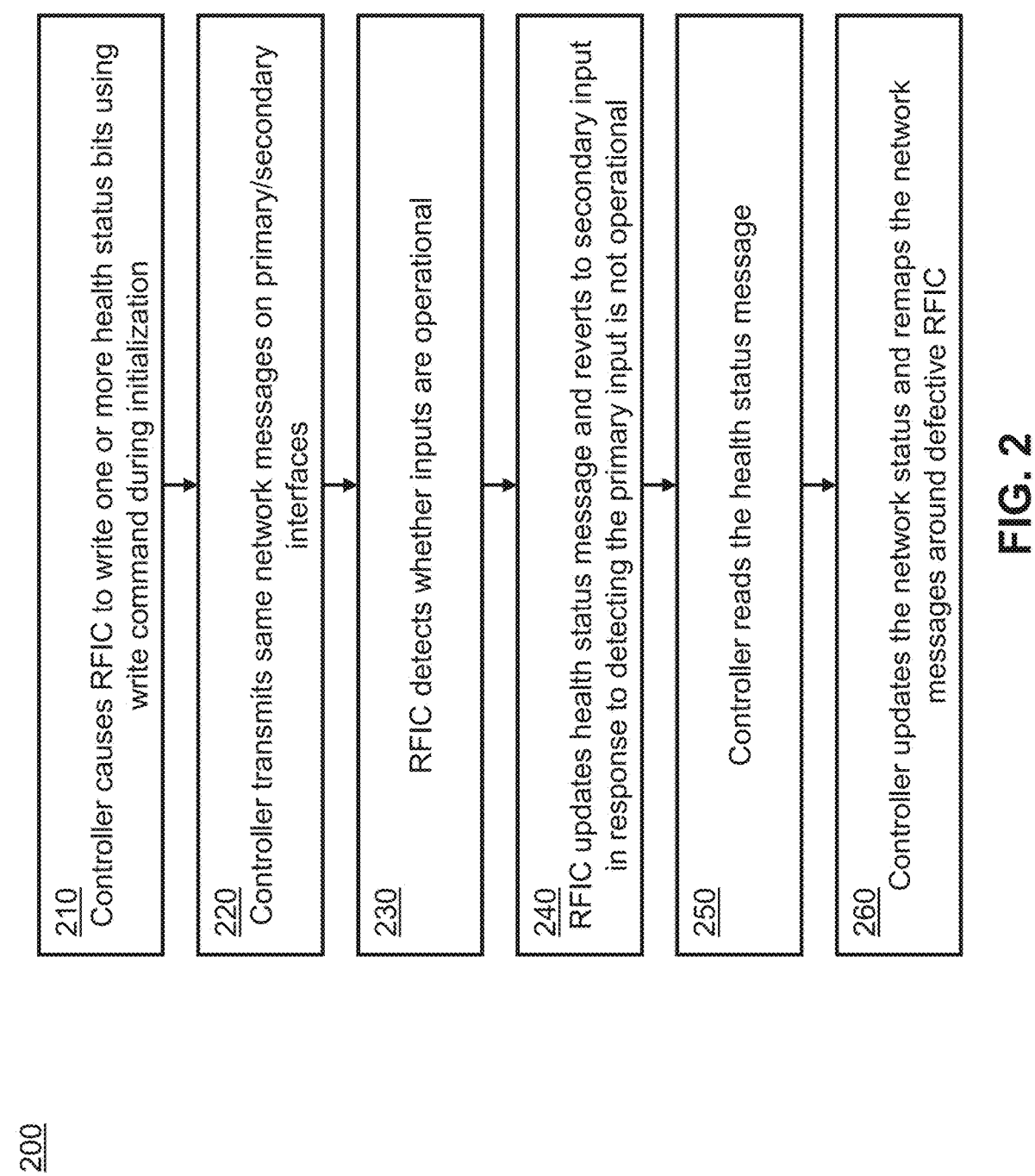
FIG. 2 depicts a flow diagram of a method, in accordance with one or more embodiments of the present disclosure.

FIG. 2 depicts a flow diagram of a method 200, in accordance with one or embodiments of the present disclosure. The method 200 may be executed by the controller 102 and/or the RFIC 104 of the AESA 100. The method 200 may be a method for monitoring the health of the RFIC 104.

In a step 210, the controller 102 causes the RFIC 104 to write a health status message into the device registers 140 during initialization of the AESA 100. The controller 102 may cause the RFIC 104 to write the health status message into the device registers 140 using the write network messages 110b. The write command frame 112b of the write network messages 110b may include a health status register address of the device registers 140. The health status register address may also be referred to as a scratchpad register address. Each of the RFIC 104 may include a unique value for the health status message. For example, the health status message may include the number of sequence of the RFIC 104 along the row of the primary point-to-point serial interfaces 106 and/or the number of the sequence of the RFIC 104 along the column of the secondary point-to-point serial interfaces 108. The location of the device registers 140. The health status message may also indicate that the RFIC 104 is currently receiving the primary inputs from the primary point-to-point serial interfaces 106.

In a step 220, the controller 102 transmits a same of the network messages 110 on the primary point-to-point serial interfaces 106 and the secondary point-to-point serial interfaces 108.

In a step 230, the RFIC 104 detects whether the primary input from the primary point-to-point serial interfaces 106 and/or the secondary input from the secondary point-to-point serial interfaces 108 are or are not operational. The RFIC 104 may detect whether the primary input and/or the secondary input are or are not operational based on the parity bits, a missing clock signal, the idle pattern of the network messages 110, or the like. The RFIC 104 may default to the primary input from the primary point-to-point serial interfaces 106 when the primary input is operational. For example, the RFIC 104 may default to the primary input as a source of register/control data.

In a step 240, the RFIC 104 may update the health status message in the device registers 140 and revert to using the secondary input from the secondary point-to-point serial interfaces 108 in response to detecting the primary input is not operational. For example, the RFIC 104 may update the health status message in the device registers 140 to indicate that the primary input has failed and is not being received. The RFIC 104 may switch to the secondary input when the primary input is not operational. The secondary input may bypass previous of the RFIC 104 and/or previous of the primary point-to-point serial interfaces 106.

In a step 250, the controller 102 may read the health status message. The controller 102 may read the health status message from the RFIC 104 by sending the read network messages 110a with the read command frame 112a including the packet payload 124 with the address at which the health status message is stored. The RFIC 104 may append the data frames 114 with the updated health status message. The controller 102 may receive the read network messages 110a with the data frames 114 appended to include the updated health status message and determine which of the RFIC 104 are operational and which of the RFIC 104 are using the primary inputs vs the secondary inputs. Thus, the controller 102 may monitor the health of the AESA 100 by sending the read network messages 110a to read the health status message from the device registers 140. The controller 102 may monitor the health of the AESA 100 by measuring the number of the data frames 114 received in combination with the health status message in the packet payload 124 of the data frames 114.

In a step 260, the controller 102 may update a network status and remap the network messages around defective of the RFIC 104. The controller 102 may determine defective of the RFIC 104 based on the health status messages. The network status may indicate the RFIC 104 are active or defective. The controller 102 may remaps the network messages 110 based on which of the RFIC 104, primary point-to-point serial interfaces 106, and/or secondary point-to-point serial interfaces are operational and which are not.

Figure 3:
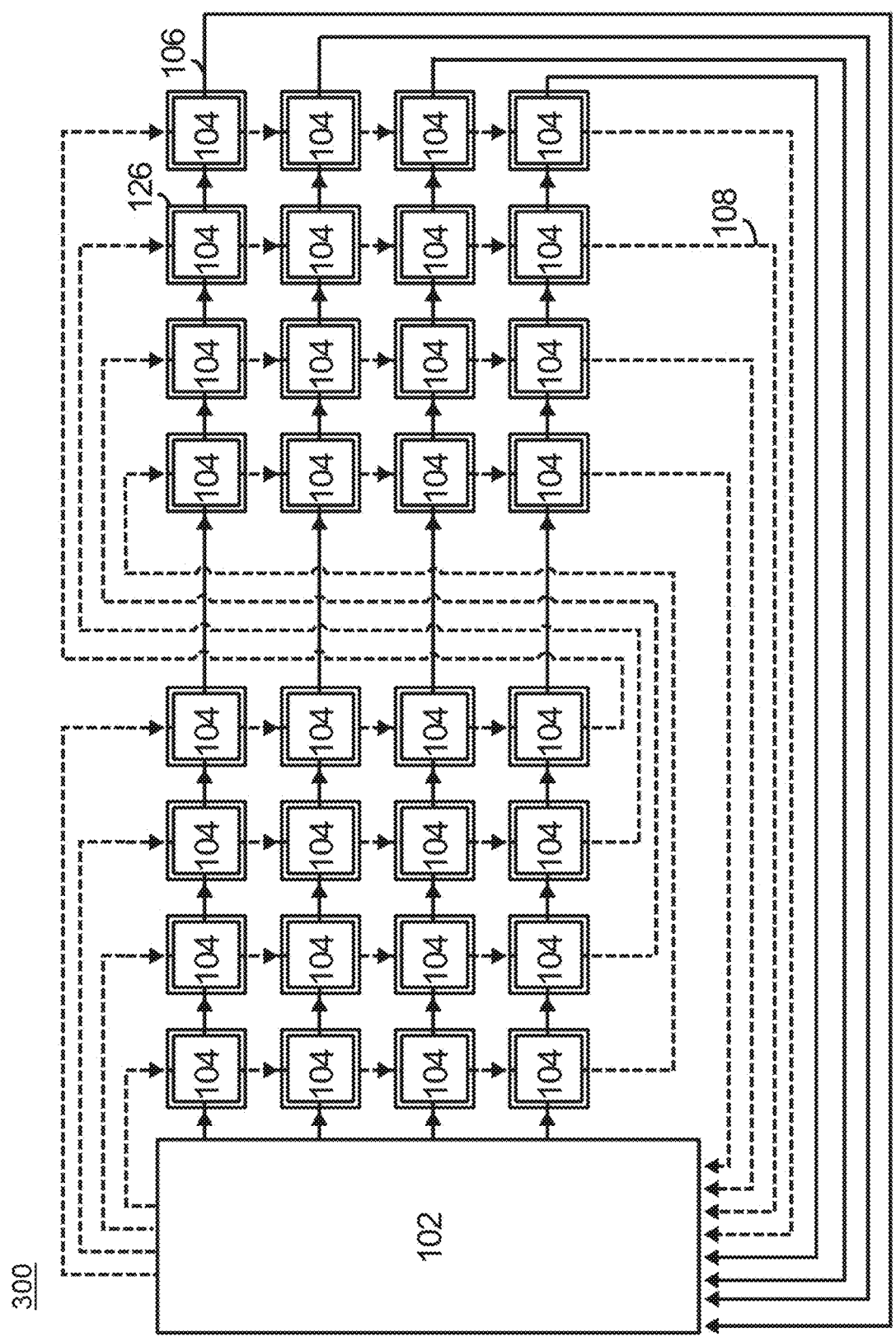
FIG. 3 depicts an architecture of the AESA, in accordance with one or more embodiments of the present disclosure.

FIG. 3 depicts the AESA 100, in accordance with one or more embodiments of the present disclosure. The AESA 100 may include the RFIC 104 may be arranged in a plurality of arrays. For example, the AESA 100 may include two or more arrays of the RFIC 104. Each of the arrays may include the lattice of the RFIC 104. For example, the arrays of the RFIC 104 may be arranged in a four-by-four array (e.g., a four-by-four array of the MCM 126). The primary point-to-point serial interfaces 106 and secondary point-to-point serial interfaces 108 may connect the arrays. The primary point-to-point serial interfaces 106 and secondary point-to-point serial interfaces 108 may connect between the arrays before going back to the controller 102. Thus, the primary point-to-point serial interfaces 106 and secondary point-to-point serial interfaces 108 may span between adjacent arrays.

Referring generally again to the figures.

The AESA 100 may be a radar system. The radar system may be an avionic radar system, a ground-based radar system, a space-based radar system, a naval-based radar system, or the like. The radar system may be a weather radar system, a sense and avoid (S&A) radar system, a ground moving target indicator (GMTI) radar system, a search and rescue radar system, a "brown out" radar system, a multi-mode signal intelligence radar system, an electronic warfare radar system, a border surveillance radar system, a fire control radar system, a millimeter wave (MMW) imaging and landing radar system, or the like. The radar system may be a hybrid frequency modulated continuous wave (FMCW)/pulsed radar system. The AESA 100 may be used in radar, communication, navigation, and surveillance systems (CNS), including Satcom. The AESA 100 may be a detect-and-avoid or due regard radar (DRR) system, a maritime rotary wing search-and-rescue radar system, a degraded visual environment (DVE) radar imaging system.

The AESA 100 may be a low probability of intercept/low probability of detection (LPI/LPD) high data rate (HDR) directional link systems, e.g., for man packs, ground vehicles, maritime and airborne applications, satellite-on-the-move (SOTM) communications, or special operations. The AESA 100 may be an anti-access area denial (A2AD) burn-through jammer AESA systems.

The controller 102 may be configured to provide low voltage differential signaling (LVDS) for the primary point-to-point serial interfaces 106 and/or the secondary point-to-point serial interfaces 108 between the controller 102 and the RFIC 104 and/or the primary point-to-point serial interfaces 106 and/or the secondary point-to-point serial interfaces 108 between the RFIC 104 and the controller 102. The LVDS may be a differential interface which may allow the primary point-to-point serial interfaces 106 and/or the secondary point-to-point serial interfaces 108 to go longer distances while maintaining signal integrity. The LVDS may be a difference in voltage between two of the wires, thereby cancelling the noise which each of the wires experience along the length of the primary point-to-point serial interfaces 106 and/or the secondary point-to-point serial interfaces 108.

The RFIC 104 may include one or more components for controlling the T/R modules 128. For example, RFIC 104 may include: limiter T/R switching, Low Noise Amplifiers (LNA), Power Amplifier (PA), variable gain reviewer and exciter amplification, attenuator phase shift (or time delay), temperature sensing, power detection, phase detection, distributed computing and memory, power supply, and the like.

The controller 102 may include one or more processors and/or memory (not depicted). The processors may be any device having one or more processing elements, which execute program instructions from memory. For example, the processors may include a multi-core processor, a single-core processor, a reconfigurable logic device (e.g., FPGAs), a digital signal processor (DSP), a special purpose logic device (e.g., ASICs), or other integrated formats. Aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A module can take the form of one or more analog circuits, electronic circuits (e.g., integrated circuits (IC), discrete circuits, system on a chip (SOCs) circuit, microcontrollers, etc.), telecommunication circuits, hybrid circuits, and any other type of "circuit." In this regard, the modules can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on), and programmable hardware devices (e.g., field programmable gate arrays, programmable array logic, programmable logic devices or the like). The modules can include a processor and one or more memory devices for storing instructions that are executable by each of the processors.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period. For example, the memory may be random access memory (RAM), and the results may not necessarily persist indefinitely in the memory.

It is noted herein that the one or more components of system may be communicatively coupled to the various other components of system in any manner known in the art. For example, the one or more processors may be communicatively coupled to each other and other components via a wireline connection or wireless connection. The wireless connection may include an unencrypted signal or an encrypted signal.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An active electronically scanned array comprising:
   a controller;
   a plurality of radio frequency integrated circuits, wherein the plurality of radio frequency integrated circuits are arranged in a lattice;
   a plurality of primary point-to-point serial interfaces; and
   a plurality of secondary point-to-point serial interfaces, wherein each of the plurality of radio frequency integrated circuits include one primary input from the plurality of primary point-to-point serial interfaces and one secondary input from the plurality of secondary point-to-point serial interfaces, wherein each of the plurality of radio frequency integrated circuits include one primary output to the plurality of primary point-to-point serial interfaces and one secondary output to the plurality of secondary point-to-point serial interfaces;
   wherein the controller and the plurality of radio frequency integrated circuits are configured to transmit a plurality of network messages between the controller and the plurality of radio frequency integrated circuits over the plurality of primary point-to-point serial interfaces and the plurality of secondary point-to-point serial interfaces;
   wherein the plurality of network messages comprise:
      a read network message comprising a read command frame and a first plurality of data frames;
      a write network message comprising a write command frame and a second plurality of data frames;
      a write-all network message comprising a write-all command frame and a third plurality of data frames; and
      a sync network message comprising a sync command frame.

2. The active electronically scanned array of claim 1, wherein the read network message and the write network message use positional addressing to define an address of the first plurality of data frames and the second plurality of data frames.

3. The active electronically scanned array of claim 2, wherein the read command frame, the first plurality of data frames, the write command frame, the second plurality of data frames, the write-all command frame, and the third plurality of data frames each comprise a same frame size.

4. The active electronically scanned array of claim 3, wherein the first plurality of data frames immediately follow the read command frame, the second plurality of data frames immediately follow the write command frame, and the third plurality of data frames immediately follow the write-all command frame.

5. The active electronically scanned array of claim 4, wherein the plurality of radio frequency integrated circuits are configured to append the first plurality of data frames to the read network message in response to receiving the read command frame, wherein the plurality of radio frequency integrated circuits are configured to truncate the second plurality of data frames from the write network message in response to receiving the write command frame.

6. The active electronically scanned array of claim 4, wherein the read command frame, the first plurality of data frames, the write command frame, the second plurality of data frames, the write-all command frame, and the third plurality of data frames each comprise a start bit, a header, and a packet payload.

7. The active electronically scanned array of claim 6, wherein the packet payload of the read command frame, the write command frame, and the write-all command frame each comprise a plurality of address bits for the first plurality of data frames, the second plurality of data frames, and the third plurality of data frames, respectively.

8. The active electronically scanned array of claim 7, wherein the plurality of radio frequency integrated circuits each comprise:
 a first receiver, a first decoder, a second receiver, a second decoder, a router, a plurality of device registers, a first encoder, a first transmitter, a second encoder, and a second transmitter; wherein the plurality of address bits contain a register address of one or more of the plurality of device registers.

9. The active electronically scanned array of claim 8, wherein the plurality of address bits do not indicate to and from which of the plurality of radio frequency integrated circuits the plurality of network messages are addressed.

10. The active electronically scanned array of claim 8, wherein the controller is configured to read a health status message from the plurality of radio frequency integrated circuits by sending the read network message with the read command frame including the packet payload with the address at which a health status message is stored in the plurality of device registers.

11. The active electronically scanned array of claim 8, wherein the plurality of radio frequency integrated circuits are each configured to write the packet payload of the third plurality of data frames into the plurality of device registers.

12. The active electronically scanned array of claim 8, wherein the first receiver and the second receiver receive serial input from the plurality of primary point-to-point serial interfaces and the plurality of secondary point-to-point serial interfaces, respectively.

13. The active electronically scanned array of claim 8, wherein the first decoder is coupled to the first receiver, wherein the second decoder is coupled to the second receiver, wherein the first decoder and the second decoder are each configured to decode a data signal to determine a command frame and one or more data frames of a network message.

14. The active electronically scanned array of claim 8, wherein the router is coupled to the first decoder, the second decoder, the plurality of device registers, the first decoder, and the second decoder.

15. The active electronically scanned array of claim 6, wherein the header comprises a plurality of bits indicating whether a frame is the read command frame, the write command frame, the write-all command frame, the sync command frame, or a data frame.

16. The active electronically scanned array of claim 1, wherein the plurality of primary point-to-point serial interfaces and the plurality of secondary point-to-point serial interfaces comprise a clock signal and a data signal, wherein one of:
 the clock signal and the data signal are on separate pins; or
 the clock signal is encoded onto the data signal using Manchester encoding.

17. The active electronically scanned array of claim 1, wherein the plurality of primary point-to-point serial interfaces are arranged orthogonal to plurality of secondary point-to-point serial interfaces.

18. The active electronically scanned array of claim 1, comprising a plurality of multi-chip modules; wherein the plurality of multi-chip modules comprise the plurality of radio frequency integrated circuits and a plurality of transmit/receive modules.

19. The active electronically scanned array of claim 1, wherein the plurality of radio frequency integrated circuits are arranged in a plurality of arrays, wherein the plurality of primary point-to-point serial interfaces and the plurality of secondary point-to-point serial interfaces connect the plurality of arrays.

20. An active electronically scanned array comprising:
 a controller;
 a plurality of multi-chip modules, wherein the plurality of multi-chip modules comprise:
  a plurality of radio frequency integrated circuits, wherein the plurality of radio frequency integrated circuits are arranged in a lattice; and
  a plurality of transmit/receive modules;
 a plurality of primary point-to-point serial interfaces;
 a plurality of secondary point-to-point serial interfaces, wherein each of the plurality of radio frequency integrated circuits include one primary input from the plurality of primary point-to-point serial interfaces and one secondary input from the plurality of secondary point-to-point serial interfaces, wherein each of the plurality of radio frequency integrated circuits include one primary output to the plurality of primary point-to-point serial interfaces and one secondary output to the plurality of secondary point-to-point serial interfaces;
 wherein the controller and the plurality of radio frequency integrated circuits are configured to transmit a plurality of network messages between the controller and the plurality of radio frequency integrated circuits over the plurality of primary point-to-point serial interfaces and the plurality of secondary point-to-point serial interfaces;
 wherein the plurality of network messages comprise:
  a read network message comprising a read command frame and a first plurality of data frames;
  a write network message comprising a write command frame and a second plurality of data frames, wherein the read network message and the write network message use positional addressing to define an address of the first plurality of data frames and the second plurality of data frames;
  a write-all network message comprising a write-all command frame and a third plurality of data frames; and
  a sync network message comprising a sync command frame.

* * * * *